United States Patent [19]

McCall et al.

[11] Patent Number: 5,341,782

[45] Date of Patent: Aug. 30, 1994

[54] ROTARY INTERNAL COMBUSTION ENGINE

[75] Inventors: W. Biswell McCall, 5 Clarita Ct., Novato, Calif. 94947; Gerald L. Merrill, Tempe, Ariz.

[73] Assignee: W. Biswell McCall, Novato, Calif.

[21] Appl. No.: 97,638

[22] Filed: Jul. 26, 1993

[51] Int. Cl.⁵ .............................................. F02B 53/00
[52] U.S. Cl. ..................................... 123/246; 418/196
[58] Field of Search ........................ 123/246; 418/196

[56] References Cited

U.S. PATENT DOCUMENTS

| | | |
|---|---|---|
| 710,756 | 10/1902 | Colbourne . |
| 1,349,882 | 8/1920 | Homan . |
| 2,097,881 | 11/1937 | Hopkins . |
| 2,410,341 | 10/1946 | Delamere . |
| 3,207,425 | 9/1965 | Morse . |
| 3,234,888 | 2/1966 | Wise et al. . |
| 3,439,654 | 4/1969 | Campbell, Jr. . |
| 3,799,126 | 3/1974 | Park . |
| 3,809,026 | 5/1974 | Snyder . |
| 4,005,682 | 2/1977 | McCall et al. . |
| 4,782,802 | 11/1988 | Koromilas ............... 123/246 |
| 4,915,596 | 4/1990 | McCall .................... 417/273 |
| 4,934,325 | 6/1990 | Snyder .................... 123/246 |

FOREIGN PATENT DOCUMENTS

| | | |
|---|---|---|
| 932224 | 8/1973 | Canada . |
| 2144802 | 3/1973 | Fed. Rep. of Germany . |
| 2415406 | 10/1974 | Fed. Rep. of Germany . |
| 2429376 | 1/1976 | Fed. Rep. of Germany . |
| 3241253 | 5/1984 | Fed. Rep. of Germany . |
| 657191 | 1/1929 | France . |
| 1128173 | 8/1956 | France . |
| 1320991 | 2/1963 | France . |
| 2311200 | 12/1976 | France . |
| 281612 | 1/1931 | Italy . |
| 483929 | 4/1938 | United Kingdom . |

OTHER PUBLICATIONS

"Rotary Engines", Wallace Chinitz, *Scientific American*, Feb. 1969.

*Primary Examiner*—Michael Koczo
*Attorney, Agent, or Firm*—Cahill, Sutton & Thomas

[57] ABSTRACT

A rotary internal combustion engine includes four generally oval-shaped rotors which rotate in the same angular direction at the same angular speed. The peripheries of adjacent rotors rotate past one another to confine a working volume therebetween. Two of such rotors have a truncated end to periodically open the working volume to exhaust combusted gases and to intake fresh air. A fuel injector mixes fuel with fresh air trapped in the working volume to form a combustible mixture. The four rotors are surrounded by a shroud having strakes for creating directed vorticity within the shroud. Turning vanes direct incoming air from an intake manifold into the working volume and also direct exhaust gases toward an exhaust manifold.

23 Claims, 6 Drawing Sheets

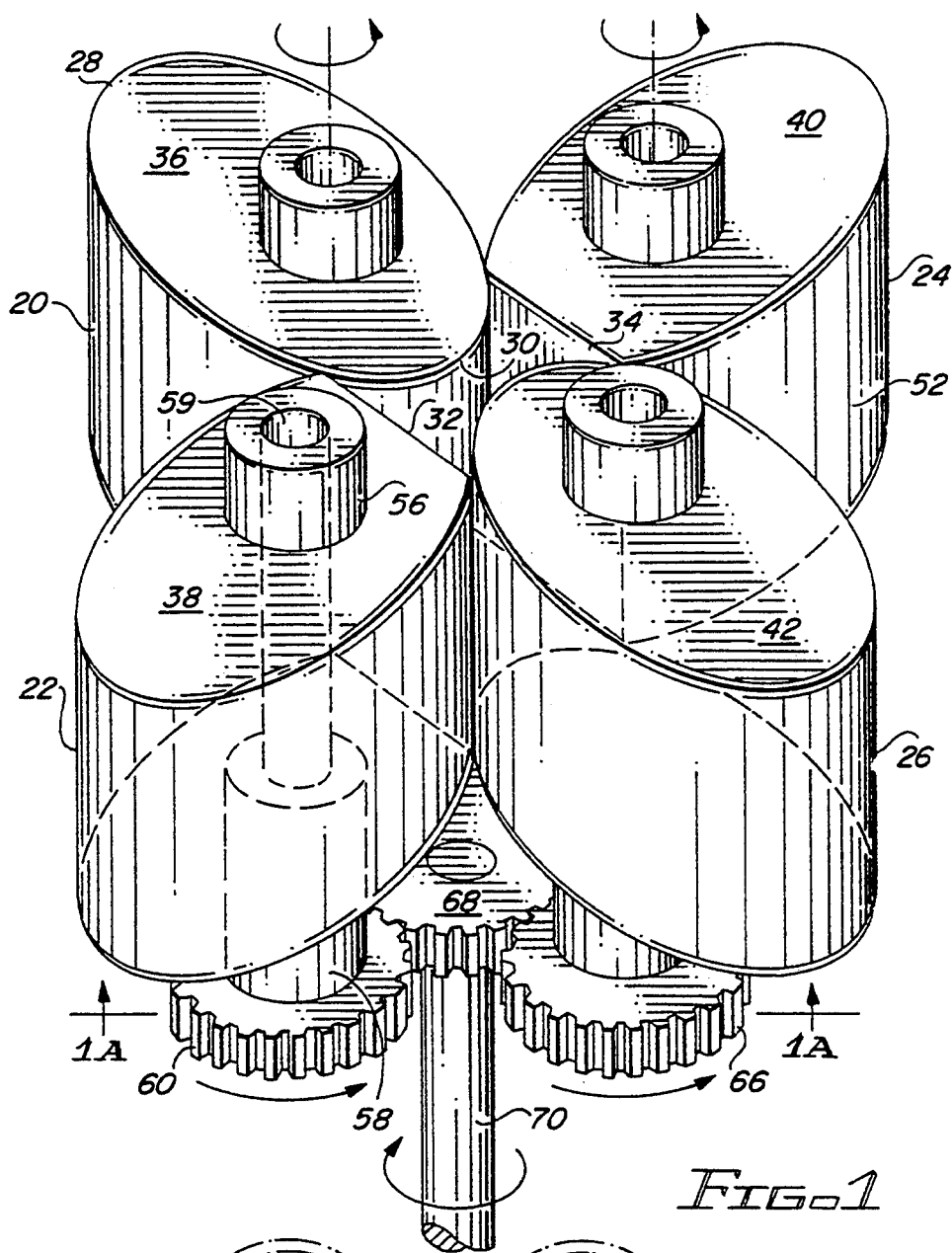
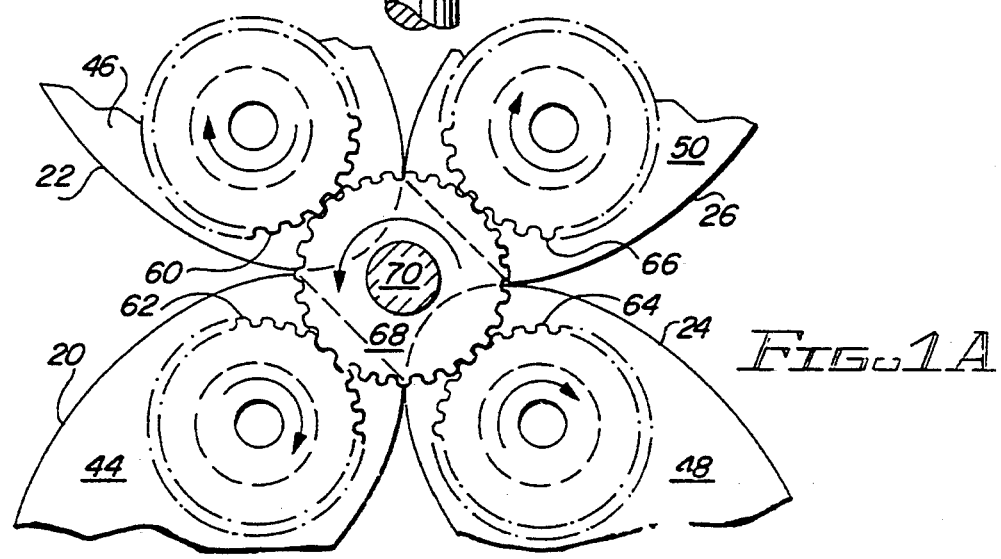

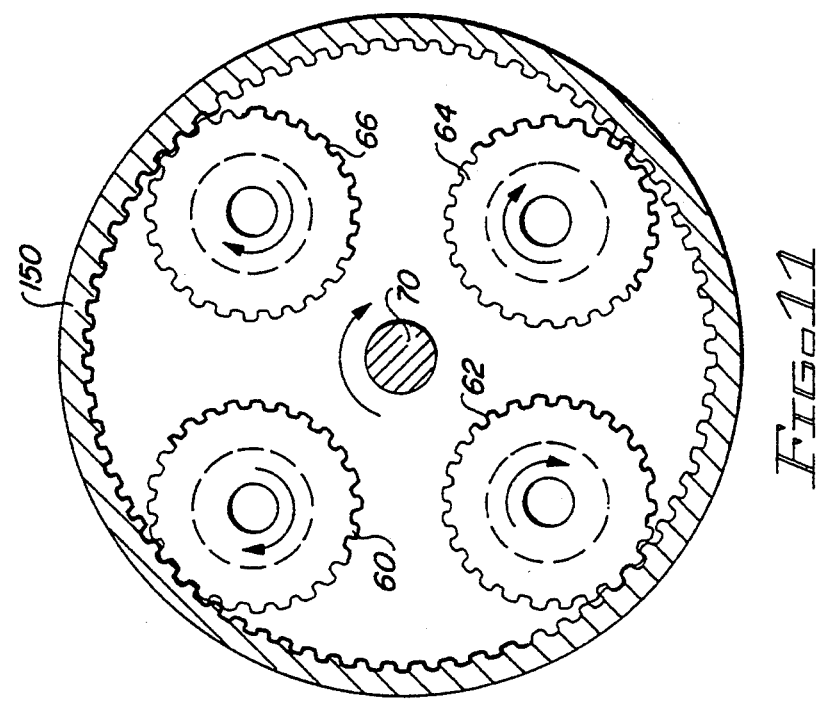
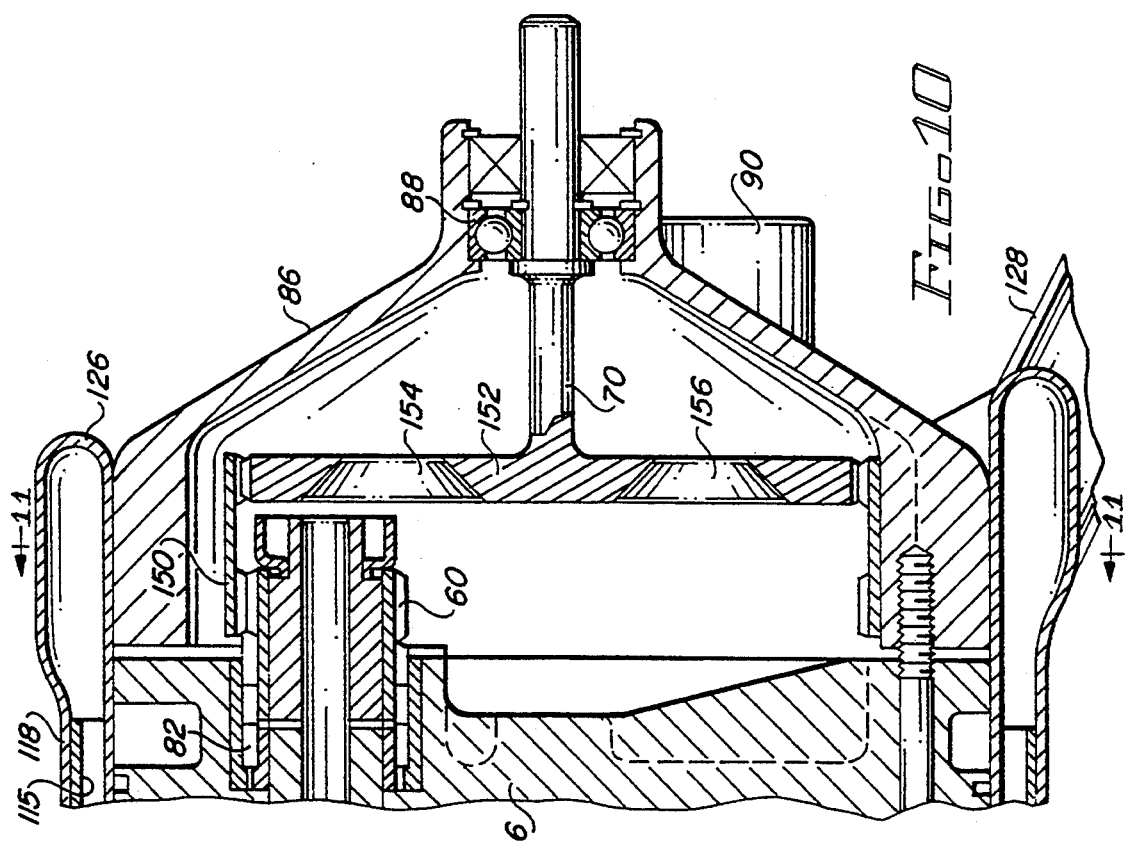

ROTARY INTERNAL COMBUSTION ENGINE

BACKGROUND OF THE INVENTION

1. Field of the Invention

The present invention relates generally to internal combustion engines, and more particularly to a rotary internal combustion engine having a group of rotors that define a working volume.

2. Description of the Background Art

While the reciprocating piston engine is by far the most commonly used form of internal combustion engine at present, those skilled in the art have long appreciated that there are several disadvantages associated with such piston engines. These disadvantages include the inefficiencies created by the reciprocating motion of the pistons within the cylinders. The typical crank and connecting rod arrangement used to couple pistons to the power output shaft create intermittent inertial loads which limit peak piston velocities. Further, mechanical friction results from piston thrust on cylinder walls due to the angle of the crank and connecting rod. Typical mechanical efficiencies of piston type engines are only 75%. In addition, piston engines have a relatively great number of components.

In addition, piston engines have limited valve port sizes, which limit how quickly combusted exhaust gases can be ejected and which limit how quickly a fresh combustible mixture can be charged within the working volume of the piston. These porting limitations also limit the size of the engine and the speed of rotation.

Others have proposed the use of pure rotary engines to eliminate the inefficiencies associated with linear reciprocating pistons. For example, in U.S. Pat. No. 710,756 to Colbourne, a rotary engine is disclosed including four rotary vanes which contact each other and which rotate synchronously about parallel shafts, each vane shaft being geared with a central gear on a main shaft. Some of the vanes have admission ports formed therein through which a pressurized working fluid is admitted into the interior space bounded by the rotors.

In U.S. Pat. No. 2,097,881 to Hopkins, a rotary engine is described including a grouping of four rotors each in frictional contact with two rotors adjacent thereto. Gears are used to synchronize the speed and angular position of each of the four rotors. The four rotors define an inner working chamber the volume of which increases and decreases as the rotors rotate. Grooves are formed in selected rotors for conveying combustible gases to and from the working volume.

Likewise, in U.S. Pat. No. 3,439,654 to Campbell, a positive displacement rotary internal combustion engine is described having four elliptical cam pistons which rotate synchronously and which form a combustion chamber between them. Each elliptical cam piston rotates on a shaft; each piston shaft is provided with a pinion gear that meshes with a drive gear on the main power output shaft. The main power shaft synchronizes each of the four piston shafts. The casing surrounding the pistons includes a series of intake ports, exhaust ports, and transfer ports to introduce a fuel mixture and scavenge exhaust gases.

U.S. Pat. No. 3,809,026 to Snyder describes a rotary vane internal combustion engine having groupings of four rotors, each of elliptical cross sectional outer configuration. The housing surrounding the rotors includes air inlet ports and exhaust gas outlet ports, and a fuel injection port communicates with each combustion chamber. The rotors are synchronized by gearing to rotate in unison. A blower is powered by the engine to blow fresh air into the air inlet ports. One of the rotors has slots formed therein for allowing fresh air into a working volume, and for allowing exhaust gases to escape from the working volume. The described engine has a diesel or compressive means of initiating combustion within the combustion chamber.

In French Patent No. 1.128.173 to Dalo, a device is shown wherein four elliptically-shaped rotors are shown, and wherein one of the four rotors has one end cut off to allow access to the working volume bounded by the four rotors.

None of the above-described patent disclosures are believed to take full advantage of the high speed that pure rotary engines potentially offer, and thereby achieving higher power. Applicants believe that the principal limitation on the speeds achievable by such prior art structures is due to the limited gas flow rates through such devices. In other words, such prior art devices do not permit fresh air to be induced quickly enough, nor permit exhaust gases to be exhausted quickly enough, to obtain high operating speeds. Moreover, many of such prior art devices rely on valve port holes formed in the casing surrounding the rotors, which port holes are sealed or opened as the rotor rotates past such port holes. However, porting of inlet and exhaust gases through casing sidewalls results in small port areas, high gas pressure loss, and low flow at high operating speeds.

Accordingly, it is an object of the present invention to provide a rotary internal combustion engine having a relatively small number of moving parts, and wherein moving parts undergo rotary motion only.

It is another object of the present invention to provide a rotary internal combustion engine of the type having rotors having walls which rotate past each other with a continuous, uniform running clearance to define a working volume therebetween, and wherein the engine can be operated at high speed to achieve greater power.

It is a further object of the present invention to provide such a rotary internal combustion engine wherein the volume surrounding the rotors can be used for both intake and exhaust flow functions at essentially atmospheric pressure.

It is a still further object of the present invention to provide such a rotary internal combustion engine wherein the porting of inlet and outlet gases does not rely on valve ports that are opened or sealed by passage of the rotor past an opening in the casing surrounding such rotors.

These and other objects of the present invention will become more apparent to those skilled in the art as the description of the present invention proceeds.

SUMMARY OF THE INVENTION

Briefly described, and in accordance with a preferred embodiment thereof, the present invention relates to a rotary internal combustion engine having a grouping of four generally oval-shaped rotors, each of the rotors having a curved peripheral side surface extending between opposing front and rear planar faces. Each of the rotors is secured to a driveshaft for supporting each rotor for rotation about an axis of rotation lying perpendicular to the front and rear planar faces of the rotor. The four driveshafts are disposed at the four corners of a square, and the peripheral surfaces of the rotors generally bound a working volume disposed between the rotors. The working volume periodically increases and decreases in size as the rotors are rotated. Front and rear endplates are disposed on opposing sides of the rotors proximate the front and rear planar faces thereof, respectively, to seal the front and rear ends of the working volume.

At least one end of each driveshaft extends through one of the front and rear endplates. Synchronizing components are coupled to the ends of the driveshafts for ensuring that all of the rotors rotate in the same angular direction and at the same angular speed of rotation. For example, such synchronizing components may include four circular gears each coupled to the end of one of the driveshafts and a fifth central gear meshed with the four circular gears.

A generally-cylindrical shroud surrounds the rotors but is spaced apart therefrom; the annulus between the interior of the shroud and the outwardly facing peripheral surfaces of the rotors defines a gas flow space outside the working volume of the rotors. An air induction mechanism is coupled to the shroud for inducting air through the gas flow space of said shroud from a front end of the shroud toward the rear end of the shroud; the air induction mechanism selectively induces air into the working volume bounded by the rotors.

A mechanism for periodically adding a fuel to the working volume is also included, such as a fuel injector; the added fuel forms a combustible mixture with the air. As the size of the working volume decreases, the combustible mixture is pressurized and ignited; the rotors are forced to rotate to increase the size of the working volume upon ignition of the combustible mixture. An exhaust mechanism is coupled to the rear end of the shroud for venting air from the gas flow space of the shroud and selectively venting exhaust gases from the working volume after ignition of the combustible mixture.

The peripheral surface of each rotor rotates past the peripheral surface of the two rotors adjacent thereto with a continuous, uniform running clearance to define the working volume. At least one, and preferably two, of the rotors have one end which is truncated. As each truncated end of such rotors rotates toward and away from the center of the working volume, openings are created to exhaust combusted gases and to intake fresh air, respectively. When two rotors include truncated ends, the two rotors are located diagonally across from one another.

The exhaust mechanism and air induction mechanism are disposed proximate the openings created by the rotor or rotors having truncated ends to selectively direct exhaust gases away from the working volume and to selectively direct fresh air into the working volume. The exhaust mechanism preferably includes turning vanes directed from an opening created by the truncated rotor toward an exhaust manifold. Likewise, the intake mechanism preferably includes oppositely directed turning vanes directed from an intake manifold toward the opening created by the truncated rotor. The intake turning vanes are radially displaced from the exhaust turning vanes by an angle substantially equal to 90 degrees.

The shroud has an interior surface, and the rotation of the rotors naturally induces a tangential circulation of air through the gas flow space of between the interior of the shroud and the exterior peripheral surfaces of the rotors. Preferably, the interior surface of the shroud includes aerodynamic strakes extending along the interior surface of the shroud generally parallel to the rotor driveshafts and suitably shaped for converting the tangential circulation of air into attached vortices of air generally flowing from the intake manifold at the front end of the shroud toward the exhaust manifold at the rear end of the shroud.

BRIEF DESCRIPTION OF THE DRAWINGS

FIG. 1 is a perspective view of four generally oval-shaped rotors, associate drive shafts, and synchronizing gears used in constructing a preferred embodiment of the present invention.

FIG. 1A is a bottom view of the components shown in FIG. 1.

FIG. 10 is a partial sectional view similar to that of FIG. 2 but showing an alternate embodiment using an outer ring gear to synchronize the pinion gears.

FIG. 11 is a sectional view of the outer ring gears and synchronizing pinion gears taken through the plane indicated by lines 11—11 in FIG. 10.

DETAILED DESCRIPTION OF THE PREFERRED EMBODIMENT

Figure 2:
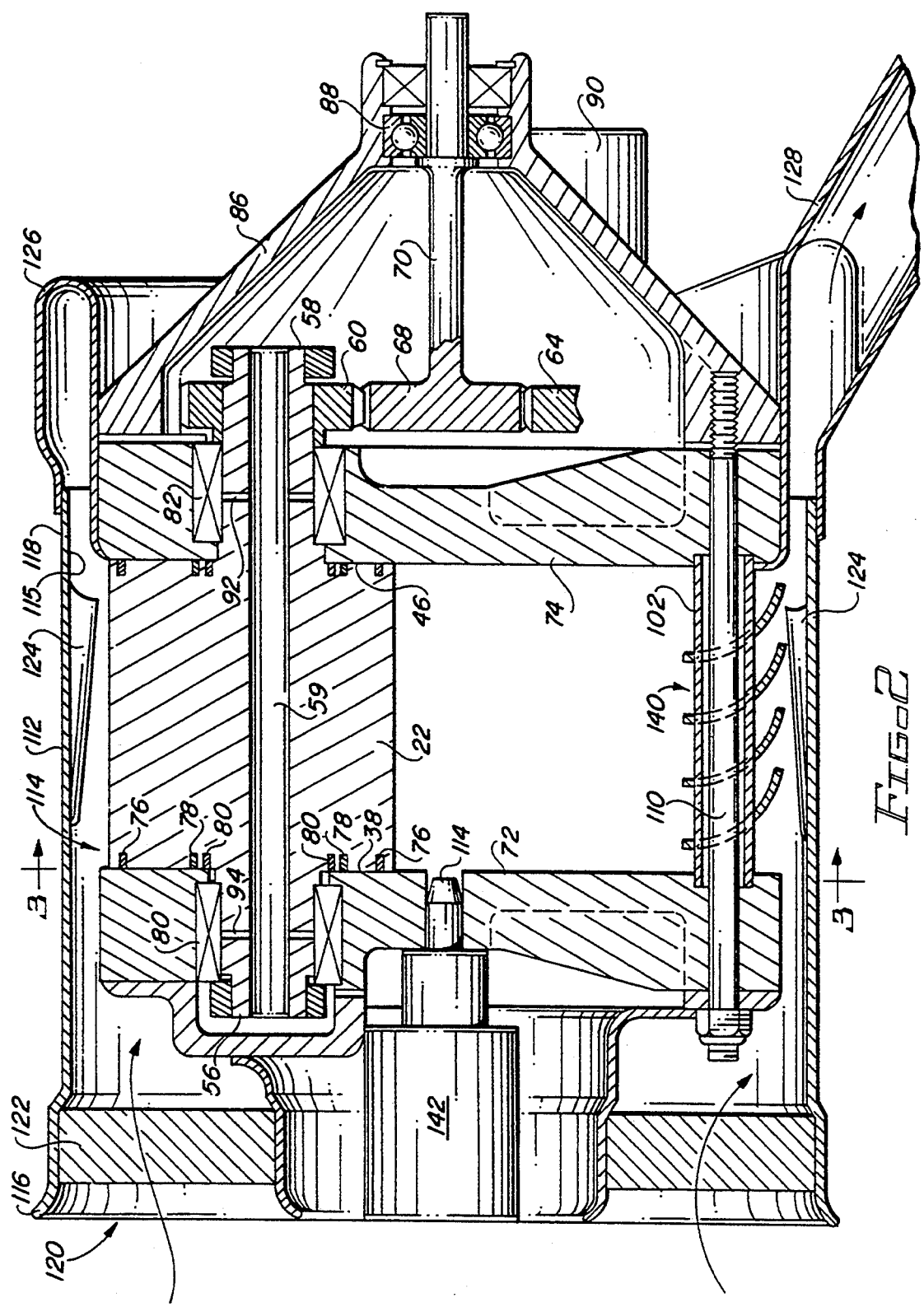
FIG. 2 is a cross-sectional side view of a rotary internal combustion engine using the four rotors shown in FIG. 1.

FIG. 1 illustrates four generally oval-shaped rotors 20, 22, 24 and 26 used in forming a rotary internal combustion engine in accordance with the preferred embodiment of the present invention. Each of the rotors has first and second opposing ends. For example, rotor 20 has a first end 28 and an opposing second end 30. As shown in FIG. 1, two of the rotors 22 and 24 have one end that is truncated; the truncated end of rotor 22 is designated by reference numeral 32, and the truncated end of rotor 24 is designated by reference numeral 34. Rotors 22 and 24 are disposed diagonally across from each other.

Still referring to FIG. 1, each of rotors 20, 22, 24, and 26 has a first planar face 36, 38, 40, and 42, respectively; the first planar faces 36, 38, 40 and 42 lie in a first common plane. Each of rotors 20–26 includes an opposing second planar face parallel to the first planar face. The opposing second planar faces of rotors 20, 22, 24, and 26 are visible in FIG. 1A as 44, 46, 48, and 50, respectively. The second planar faces 44–50 lie in a second common plane. Each of rotors 20–26 has a peripheral surface extending between the first and second planar faces thereof; for example, rotor 24 includes a curved peripheral surface 52 extending between opposing planar faces 40 and 48.

As explained in greater detail below, the peripheral surface of each rotor is closely proximate to the peripheral surfaces of the two rotors adjacent thereto as the group of rotors 20–26 are rotated. The peripheral surfaces of each of rotors 20–26 rotates past the peripheral surface of the two rotors adjacent thereto with a continuous, uniform running clearance of 0.003 inch or less to generally surround and bound a central working volume disposed between such rotors; this central working volume periodically increases and decreases in size as rotors 20–26 are rotated.

Each of rotors 20–26 has a central axis of rotation extending perpendicular to its first and second planar faces; for example, the central axis of rotation of rotor 24 is indicated by dashed line 54 which extends perpendicular to planar faces 40 and 48 of rotor 24, and which extends through the geometric center of rotor 24. Each rotor has a drive shaft extending through its central axis of rotation for supporting the rotor for rotation about its central axis of rotation; these driveshafts may either be separate components that are secured to each rotor, or they may be integral with each rotor. For example, in FIG. 1, rotor 22 includes an upper cylindrical shaft 56 extending from planar face 38 and a longer lower cylindrical shaft 58 extending from planar face 46; together, upper cylindrical shaft 56 and lower cylindrical shaft 58 form a drive shaft for rotatably supporting rotor 22 along the central axis of rotation thereof. The drive shafts of rotors 20–26 are disposed at the four corners of a square. As indicated in FIG. 1, upper drive shaft 56 and lower drive shaft 58 may be connected internally by a central bore 59 extending through rotor 22 for conveying lubricating oil from one end of the drive shaft to the other end; such lubricating oil may be used to lubricate bearing surfaces that rotatably support such drive shafts.

Rotors 20–26 all rotate in the same angular direction at the same angular speed of rotation. A gearing arrangement is used to synchronize the movement of such rotors. As shown in FIGS. 1 and 1A, the lowermost portion of each rotor drive shaft is coupled to a pinion gear. For example, lower drive shaft 58 of rotor 22 is secured to pinion gear 60; likewise, the drive shafts associated with rotors 20, 24, and 26 are secured to pinion gears 62, 64, and 66, respectively. The teeth of each of pinion gears 60–66 are meshed with the teeth of a central spur gear 68 secured to power output shaft 70. Pinion gears 60–66 and spur gear 68 all have the same pitch and the same number of teeth as each other. Accordingly, all of the gears rotate at the same angular speed. Assuming that central spur gear 68 rotates counterclockwise relative to FIG. 1A, then all of the pinion gears rotate in a clockwise direction, as indicated in FIG. 1A. Thus, pinion gears 60–66 and central spur gear 68 collectively provide a means for synchronizing the angular speed and direction of the rotation of the four rotors 20–26. Those skilled in the art will appreciate that while a central spur gear is shown, a ring gear or other arrangements may be used to achieve such synchronization.

Figure 4:
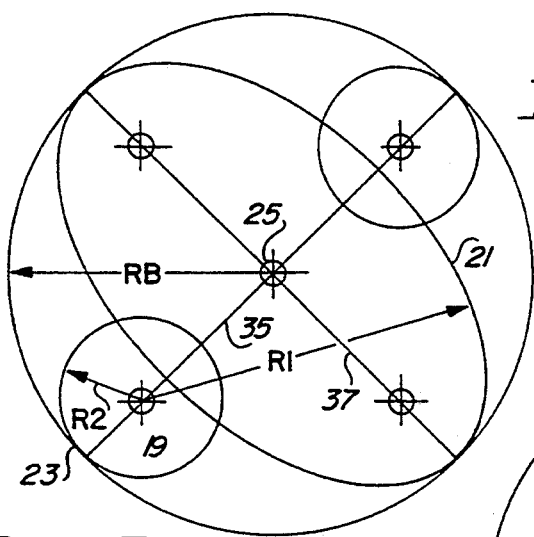
FIGS. 4, 5, 6, 7, and 8 are schematic drawings illustrating the manner in which the outer peripheral surfaces of the rotors are designed to provide a continuous, uniform running clearance between adjacent rotors.

The design of the contour of the peripheral surfaces of rotors 20–26 is best explained in conjunction with FIGS. 4–8. Each generally oval-shaped rotor is comprised of four arc segments defined by two radii. In FIG. 4, dimension RB designates the radius of a circle in which the rotor may be inscribed. Center point 25 corresponds with the geometric center of the rotor. Within FIG. 4, dimension R1 represents the rotor major radius which sweeps through an arc, labelled 21, defining the major contour of the rotor between its opposing ends. The centerpoint of the rotor major radius is labelled 19. Centerpoint 19 is located along the minor axis 35 of the rotor and is spaced from geometric centerpoint 25 by a distance equal to dimension RB minus dimension R2; dimension R2 represents the rotor minor radius which sweeps through a smaller arc, labelled 23, defining the contour of the rotor at each of its opposing ends. The overall rotor contour for each of the four rotors represents a merger of the major arcs swept by the rotor major radius with the smaller arcs swept by the rotor minor radius adjacent the ends of each rotor along major axis 37. The superposition of these major and minor arcs to form the overall rotor contour is shown graphically in FIG. 6. At the point where the arcs of the two radii meet, a line drawn tangent to such intersection point lies at 45 degrees to both major axis 37 and minor axis 35.

Figure 5:
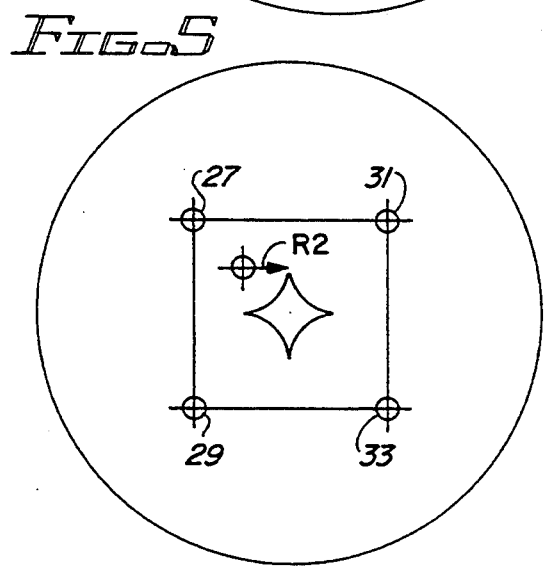
Figure 6:
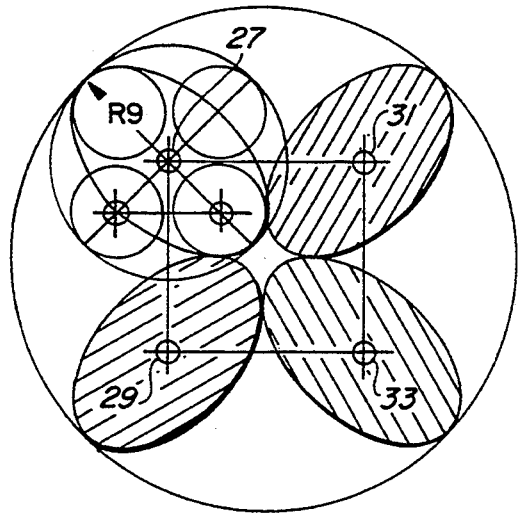

In FIG. 5, the geometric centers of the four rotors are designated by points 27, 29, 31, and 33. The smallest central working volume for a given engine occurs when the end portions of each of the rotors is directed toward the center of the engine. In this event, the central working volume is a small diamond shaped figure, each side of which is formed by an arc corresponding to the rotor minor radius R2, as shown in FIGS. 5 and 6.

Figure 7:
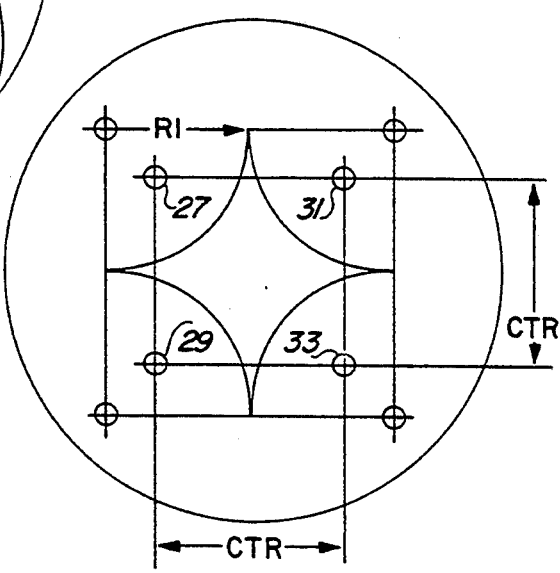
Figure 8:
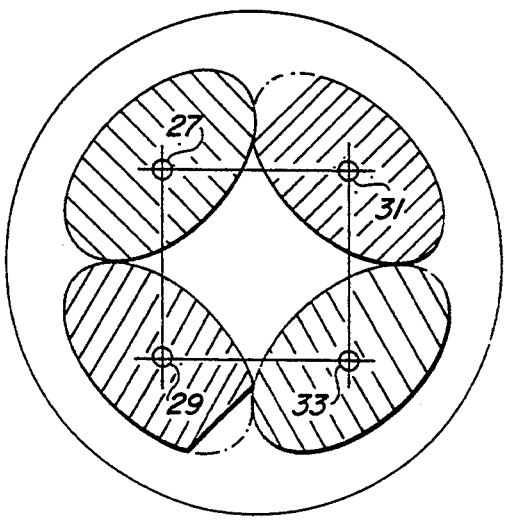

In contrast, FIGS. 7 and 8 show the largest central working volume for a given engine, which occurs when the broader side portions of the rotors are directed toward the center of the engine. In this event, the central working volume is a larger diamond shaped figure, each side of which is formed by an arc corresponding to the rotor major radius R1, as shown in FIGS. 7 and 8.

The compression ratio of the engine can be selected to some degree by varying the rotor major radius and rotor minor radius. The compression ratio is the ratio of R1 squared to R2 squared.

Figure 3:
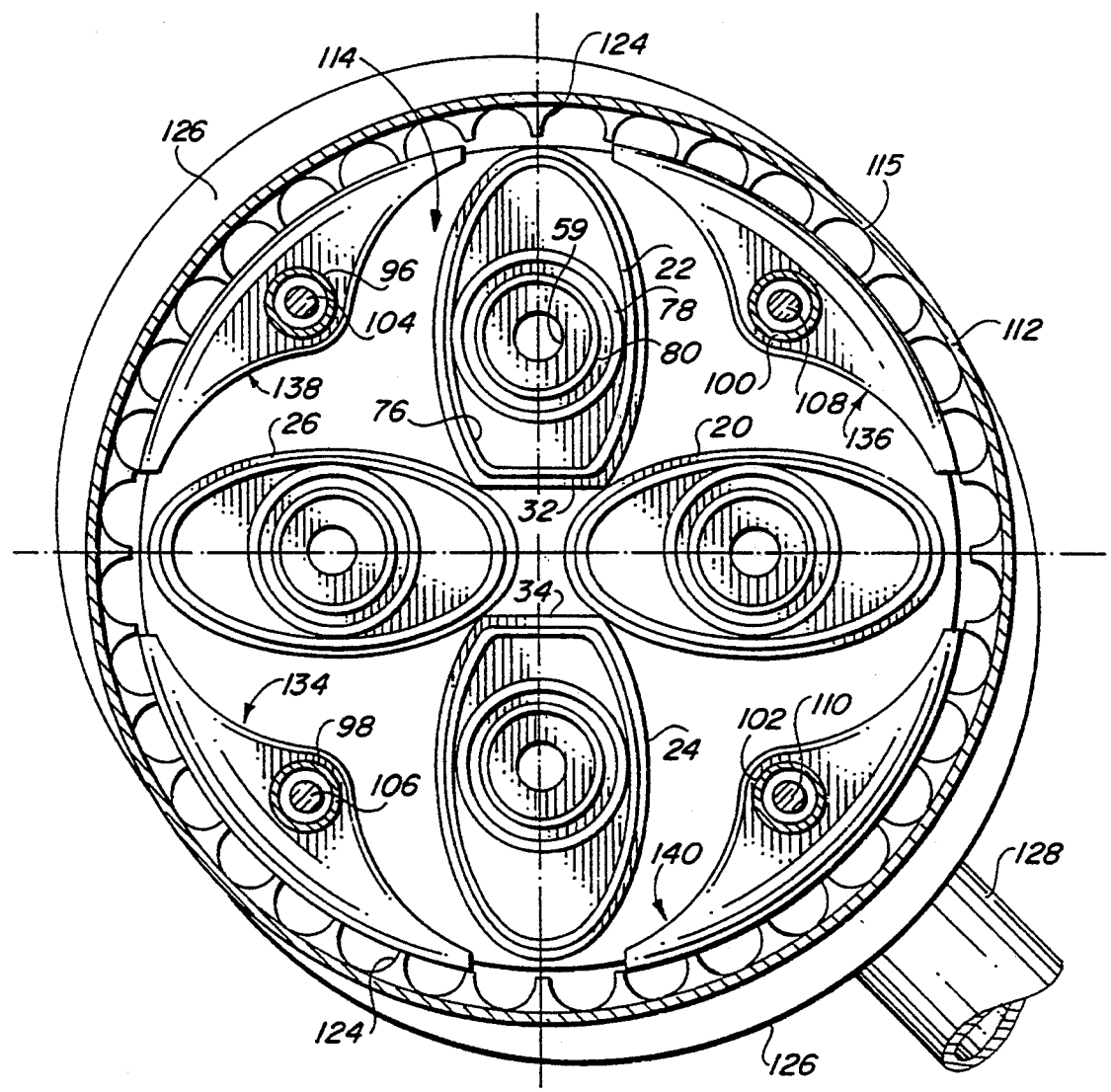
FIG. 3 is a cross-sectional lateral view of the rotary internal combustion engine shown in FIG. 2 sectioned through the plane labelled 3—3 in FIG. 2.

FIGS. 2 and 3 illustrate the rotary internal combustion engine in which rotors 20–26 are contained. For the purpose of clarity, only rotor 22 is shown within FIG. 2. As indicated above, a central working volume is bounded by the peripheral surfaces of the rotors. In order to seal the front and rear sides of the central working volume adjacent the planar faces of such rotors, a first endplate 72 is disposed proximate and parallel to planar faces 36–42 of rotors 20–26, respectively, and a second opposing endplate 74 is disposed proximate and parallel to planar faces 44–50 of rotors 20–26, respectively. Thus, endplates 72 and 74 lie on opposing sides of, and bound opposing ends of, the central working volume. The sliding seal formed between the planar faces of the rotors and endplates 72 and 74 is enhanced by a series of sealing rings inserted within the planar faces of the rotors. For example, in FIGS. 2 and 3, planar face 38 of rotor 22 is shown having an outer sealing ring 76 which generally follows the outer contour and shape of the rotor. Two circular inner sealing rings 78 and 80 are also inset into planar face 38 concentric with upper drive shaft 56. Similar sealing rings may be provided in opposing planar face 46, and upon the planar faces of the other rotors.

As shown in FIG. 2, lower drive shaft 58 of rotor 22 extends through a bore formed in endplate 74, and endplate 74 divides rotor 22 from pinion gear 60. The bore through which lower drive shaft 58 extends includes a bearing surface 82 for rotatably supporting drive shaft 58. Likewise, each of the drive shafts for the remaining rotors 20, 24, and 26 has an end extending through, and rotatably supported by, second endplate 74 for allowing its associated pinion gear to engage central spur gear 68. As is also shown in FIG. 2, upper drive shaft 56 of rotor 22 extends through a bore formed in first endplate 72, and a bearing surface 84 is secured within such bore for rotatably supporting drive shaft 56. The drive shafts of the remaining rotors 20, 24, and 26 are similarly rotatably supported by first endplate 72.

Still referring to FIG. 2, a cowl 86 is secured to and extends around second endplate 74 for enclosing pinion gears 60–66 and central spur gear 68. Power output shaft 70 extends through the center of cowl 86 and is rotatably supported by bearing assembly 88 secured within cowl 86. Oil pump 90 circulates an air/oil mist within cowl 86 to lubricate the gears. A portion of such air/oil mist enters bore 59 extending through the drive shaft of rotor 22; oil passages 92 and 94 formed in drive shaft 58 and drive shaft 56, respectively, allow the oil mist within bore 59 to lubricate bearing surfaces 82 and 84, respectively.

As shown in FIG. 3, endplates 72 and 74 are spaced apart from each other by a series of four spacer tubes 96, 98, 100, and 102; only spacer tube 102 is visible within FIG. 2 for ease of illustration. These spacer tubes are approximately equal in length to the distance separating the opposing planar faces of rotors 20–26. Endplates 72 and 74 are held to each other by four studs 104, 106, 108, and 110 which extend through spacer tubes 96, 98, 100, and 102, respectively. The spacer tubes not only serve to separate endplates 72 and 74 from each other by a precise distance, but also serve to isolate studs 104–110 from hot combustion gases.

Still referring to FIGS. 2 and 3, a generally-cylindrical shroud 112 surrounds the rotors and is spaced apart therefrom for defining a gas flow space outside the central working volume bounded by the rotors. This gas flow space is generally designated by reference numeral 114 in FIGS. 2 and 3 and extends between inner surface 115 of shroud 112 and the outer-facing peripheral surfaces of rotors 20–26. Shroud 112 includes a first or front end 116 and an opposing second or rear end 118. A circular doughnut-shaped air intake manifold 120 is formed at front end 116 of shroud 112 for admitting fresh air into shroud 112. An annular air filter element 122 is disposed within intake manifold 120 to filter incoming air. As will be explained in greater detail below, air intake manifold 120 forms a portion of a means for inducting air into the central working volume of the rotary internal combustion engine.

As indicated above, rotors 20–26 rotate in unison. As rotors 20–26 rotate, their peripheral surfaces push upon the air within gas flow space 114 and induce a tangential circulation of air therein. As shown in FIGS. 2 and 3, a series of aerodynamic strakes extend along the interior surface 115 of shroud 112 generally parallel to the rotor drive shafts. As shown best in FIG. 3, strakes 124 are equiangularly spaced about the interior surface of shroud 112. Moreover, as shown best in FIG. 2, strakes 124 are relatively short near endplate 72 and become gradually taller approaching rear end 115 of shroud 112. The purpose of such strakes is to convert the tangential air flow induced within gas flow space 114 by the rotating rotors to strong vortices directed from the front end 116 of shroud 112 toward the rear end 115 thereof. In addition, the strakes may be cambered along their length to maximize their aerodynamic efficiency. Thus, strakes 124 form a means for aerodynamically directing air in a predetermined direction through gas flow space 114 of shroud 112 from the air intake manifold 120 toward the rear end 115 of shroud 112.

Also shown in FIGS. 2 and 3 is a generally annular-shaped exhaust manifold 126 in communication with the rear end 115 of shroud 112 for carrying away air and exhaust gases from gas flow space 114. An exhaust pipe 128 extends from exhaust manifold 126 for venting such air and exhaust gases.

Figure 9A:
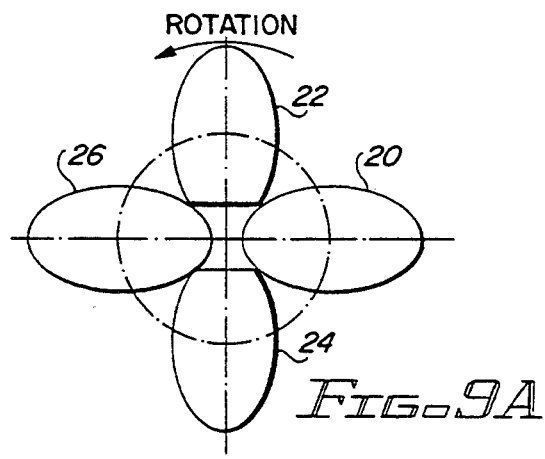
FIGS. 9A–9H are schematic drawings illustrating the various stages of synchronized rotation of the rotors, as well as the intake, compression, power, and exhaust cycles of the rotary internal combustion engine.

Before proceeding further with the description of the structure shown in FIGS. 2 and 3, it will be helpful to first describe the various strokes of each power cycle of the rotary internal combustion engine of the present invention. The present rotary internal combustion engine is a four stroke cycle engine, wherein one power stroke is provided for each 360 degrees of rotation of rotors 20–26. FIGS. 9A–9H sequentially illustrate the four strokes of the engine for one complete revolution of each rotor. In FIG. 9A, rotors 20–26 are shown viewed from the top of FIG. 1 or as illustrated in FIG. 3, such that the rotors are each rotating in a counter-clockwise direction.

In FIG. 9A, rotors 20–26 are shown at a zero degree position immediately after the exhaust stroke and immediately prior to the intake stroke; in this position, truncated ends 32 and 34 of rotors 22 and 24 face directly toward each other. In FIG. 9B, rotors 20–26 have advanced 45 degrees from the zero degree position, corresponding to the middle of the air intake stroke. As truncated end 32 of rotor 22 rotates to face rotor 20, a first opening, or first intake path, is created for allowing fresh air to be drawn into the central working volume; truncated end 32 of rotor 22 is a portion of the peripheral surface of rotor 22, and bounds the first intake path when rotors 20–26 are in the angular orientation shown in FIG. 9B. Similarly, as truncated end 34 of rotor 24 turns to face rotor 26, a second opening, or second intake path, is created for allowing fresh air to be drawn into the central working volume; truncated end 34 of rotor 24 is a portion of the peripheral surface of rotor 24, and bounds the second intake path when rotors 20–26 are in the angular orientation shown in FIG. 9B. The first intake path passes between the peripheral surfaces of rotors 20 and 22, and the second intake path passes between the peripheral surfaces of rotors 24 and 26. These first and second intake paths fluidly couple the central working volume and the surrounding gas flow space (see reference numeral 114 in FIGS. 2 and 3). Intake gas consisting of fuel and air is admitted into the central working space from gas flow space 114 through these first and second intake paths when rotors 20–26 are in the angular orientation 18 shown in FIG. 9B. Within FIG. 9B, incoming air is designated by arrows 130. Thus, the bottom left and upper right quadrants shown in FIGS. 9A–9H may be regarded as inlet quadrants since air is drawn into the working volume at such points.

Figure 9E:
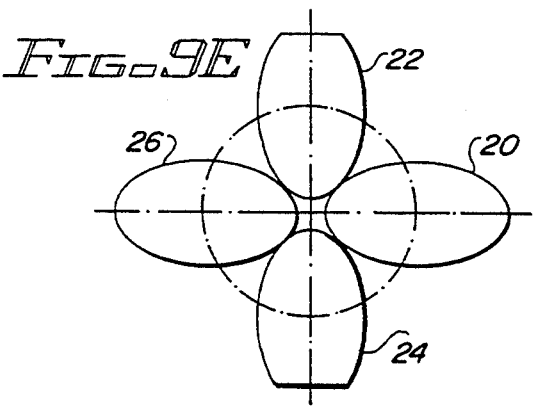
Figure 9B:
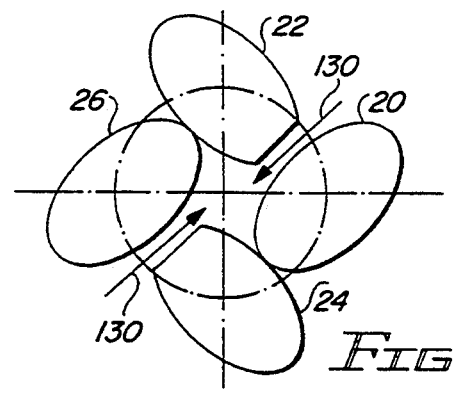
Figure 9F:
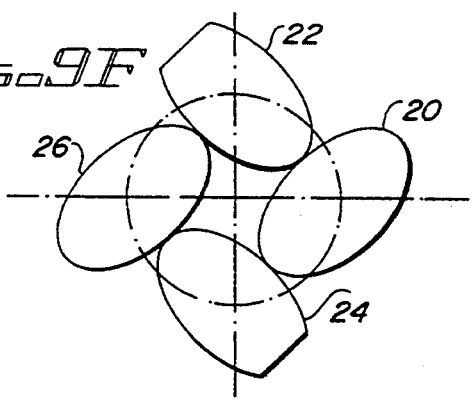
Figure 9C:
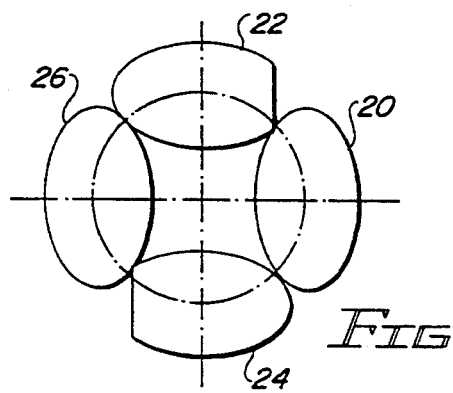
Figure 9G:
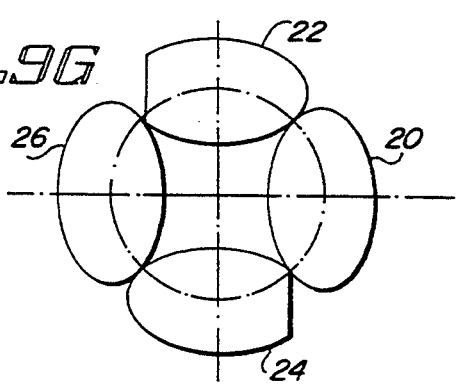
Figure 9D:
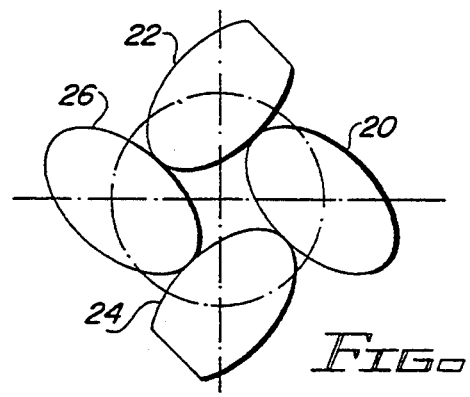

In FIG. 9C, rotors 20–26 have advanced an additional 45 degrees, for a total of 90 degrees of rotation from the zero degree position. FIG. 9C corresponds to the end of the intake stroke and the beginning of the compression stroke. FIG. 9C also corresponds to the maximum size of the central working volume. In FIG. 9D, rotors 20–26 have advanced an additional 45 degrees, for a total of 135 degrees of rotation from the zero degree position. FIG. 9D corresponds to the midpoint of the compression stroke.

FIG. 9E corresponds to the top dead center position, or 180 degrees of rotation from the zero degree position. Truncated ends 32 and 34 are directed away from the central working volume, This position corresponds to the end of the compression stroke and the beginning of the power stroke; it also represents the minimum size of the central working volume. Assuming that the central working volume contains a combustible fuel mixture, the fuel mixture has exploded and is forcing the central working volume to expand.

In FIG. 9F, rotors 20-26 have rotated 45 degrees beyond the top dead center position for a total rotation of 225 degrees past the zero degree position. This position corresponds to the midpoint of the power stroke. In FIG. 9G, rotors 20-26 have advanced another 45 degrees, for a total rotation of 270 degrees beyond the zero degree position. At this position, the central working volume has returned to its maximum size. This position corresponds with the end of the power stroke and the beginning of the exhaust stroke.

Figure 9H:
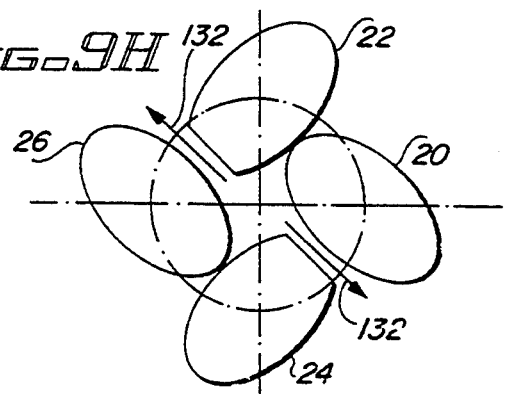

In FIG. 9H, rotors 20-26 have rotated an additional 45 degrees, for a total rotation of 315 degrees beyond the zero degree position. This position corresponds to the midpoint of the exhaust stroke. As truncated end 32 of rotor 22 rotates to face rotor 26, a first opening, or first exhaust path, is created for allowing exhaust gases to exit the central working volume; similarly, as truncated end 34 of rotor 24 turns to face rotor 20, a second opening, or second exhaust path, is created for allowing exhaust gases to exit the central working volume. The first exhaust path passes between the peripheral surfaces of rotors 20 and 24, and the second exhaust path passes between the peripheral surfaces of rotors 22 and 26. These first and second exhaust paths fluidly couple the central working volume and gas flow space 114. Thus, exhaust gas is exhausted from the central working volume into gas flow space 114 through the first and second exhaust paths when rotors 20-26 are in the angular orientation shown in FIG. 9H. Within FIG. 9H, escaping exhaust gases are designated by arrows 132. Thus, the upper left and lower right quadrants shown in FIGS. 9A-9H may be regarded as outlet quadrants since exhaust gases are drawn from the working volume at such points.

Returning to FIGS. 2 and 3, it has already been explained above that aerodynamic strakes 24 generally induce a flow of air from intake manifold 120 axially toward exhaust manifold 126. Additional structures are provided to facilitate the induction of fresh air from the intake manifold into the central working volume, and to direct exhaust gases escaping from the central working volume toward the exhaust manifold. Referring to FIG. 3, two sets of intake turning vanes, or intake air vanes, are provided for directing air toward the central working volume. The first set of intake turning vanes is designated generally by reference numeral 134 and is disposed in the intake quadrant in the lower left portion of FIG. 3, positioned between shroud 112 and rotors 24 and 26. Thus, intake turning vanes 134 are disposed proximate to truncated rotor 24 and proximate the opening created by truncated end 34 of rotor 24 during the intake stroke for inducting air into the central working volume. The second set of intake turning vanes is designated generally by reference numeral 136 and is disposed in the intake quadrant in the upper right portion of FIG. 3, positioned between shroud 112 and rotors 20 and 22. Thus, intake turning vanes 136 are disposed proximate to truncated rotor 22 and proximate the opening created by truncated end 32 of rotor 22 during the intake stroke for inducting air into the central working volume. Thus, vanes 134 and 136 are configured to direct the intake air from the gas flow space 114 toward the central working volume.

In addition, two sets of exhaust turning vanes, or exhaust air vanes, are provided for directing exhaust gases away from the central working volume and toward exhaust manifold 126. The first set of exhaust turning vanes is designated generally by reference numeral 138 and is disposed in the outlet quadrant in the upper left portion of FIG. 3, positioned between shroud 112 and rotors 22 and 26. Thus, exhaust turning vanes 138 are disposed proximate to truncated rotor 22 and proximate the opening created by truncated end 32 of rotor 22 during the exhaust stroke for receiving exhaust gases therefrom. The second set of exhaust turning vanes is designated generally by reference numeral 140 and is disposed in the outlet quadrant in the lower right portion of FIG. 3, positioned between shroud 112 and rotors 20 and 24. Thus, exhaust turning vanes 140 are disposed proximate to truncated rotor 24 and proximate the opening created by truncated end 34 of rotor 24 during the exhaust stroke for receiving exhaust gases therefrom. Exhaust vanes 138 and 140 are configured to direct the exhaust air from the central working volume into gas flow space 114. The intake turning vanes 134 and 136 are radially displaced from exhaust turning vanes 138 and 140 by an angle substantially equal to 90 degrees.

Exhaust turning vanes 140 are shown in greater detail in FIG. 2. During the exhaust stroke, escaping exhaust gases flow radially outward at high velocity from the central working volume. Exhaust turning vanes 140 are aerodynamic vanes that are brazed to spacer tube 102 for support and which turn exhaust gases escaping from the lower right outlet quadrant toward the rear end 115 of shroud 112 during the exhaust stroke. Such redirected exhaust gases are then directed through exhaust manifold 126 and entrain some of the excess air in the gas flow space by the ejector process. The exhaust turning vanes 138 in the upper-left quadrant of FIG. 3 are of identical construction and function in the same manner.

The intake turning vanes 134 and 136 are of similar construction to exhaust turning vanes 138 and 140, except that intake turning vanes 134 and 136 are oppositely directed; fresh air passing through gas flow space 114 is caught by the outermost edges of intake turning vanes 134 and 136 and redirected along such vanes toward the central working volume. During the intake stroke, such redirected fresh air is aimed toward the openings formed in the central working volume. Thus, the intake turning vanes are a first aerodynamic means which, together with the truncated ends 32 and 34 of rotors 22 and 24, selectively induct air into the central working volume. Likewise, the exhaust turning vanes are a second aerodynamic means which, together with the truncated ends 32 and 34 of rotors 22 and 24, selectively exhaust gases from the central working volume in a predetermined direction through the gas flow space toward the exhaust manifold.

Fuel must be added to the central working volume to form a combustible mixture to power the rotary internal combustion engine. As shown in FIG. 3, an electronically controlled fuel injector 142 is centrally mounted on front endplate 72, and the injection pintle 144 extends through a centrally-located bore formed in endplate 72 for injecting fuel pulses into the central working volume. In the preferred embodiment of the invention, this fuel is a diesel fuel which self-ignites under the heat and pressure within the central working volume; this type of engine is generally known as a compression-ignition form of engine. Fuel injector 142 periodically injects a pulse of diesel fuel into the central working volume just before rotors 20-26 reach their top dead center position. The central working volume forms an elongated, relatively narrow combustion chamber when approaching the top dead center position; accordingly, fuel injector 142 preferably sprays the fuel in the form of a narrow stream of droplets down the centerline of the central working volume over the length thereof. The rotating movement of the rotors develops a vorticity inside the central working volume which disperses the fuel droplets and which aids in mixing the injected fuel with the compressed charge of air. As the rotary internal combustion engine of the present invention is preferably operated at high speeds, fuel injector 142 preferably operates at a high rate using short injection pulses of fuel.

Total engine air consumption is designed to be nominally twice that of the amount of air actually used in the combustion cycle. The excess air is used to air-cool the rotors and to provide an intake plenum function, thereby separating the intake and exhaust flows aerodynamically. Incidentally, since the peripheral surfaces of the rotors that are exposed to combustion gases are rotated and exposed to the cooling air flowing in the gas flow space, air cooling of the rotors is facilitated.

Because the rotary internal combustion engine of the present invention has no reciprocating parts, the maximum rotational speed of the engine is essentially limited by the maximum tip speed of its rotors. This maximum rotor tip speed may exceed 500 ft./sec. For example, an engine using rotors measuring four inches end to end, and measuring four inches in axial length, can provide a volumetric compression ratio of 20:1, and 21.86 cubic inch displacement. If the tip speed of the rotors is limited to 150 feet per second, the engine would run at approximately 8600 RPM. At this speed, the fuel injector fires almost 150 times per second. Such speeds are much greater than conventional peak piston velocities of even high-speed piston engines which are limited to perhaps 50-70 feet per second.

While not shown, a starter motor would need to be provided to initially turn the rotors and to compress and ignite the fuel mixture. Rotation of the rotors under the influence of the starter motor also induces air flow through the gas flow space, as explained above. In addition, those skilled in the art will appreciate that a fan or blower can be added to further induce a flow of air through the gas flow space and thereby provide a form of light supercharging. Such a fan or blower can be powered from the power output shaft and can be disposed either at the intake manifold or at the exhaust manifold.

While a variety of materials may be used to construct the above-described rotary internal combustion engine, the preferred embodiment utilizes lightweight ceramic material to form the rotors and end plates surrounding the central working volume. One preferred form of ceramic is reinforced aluminum titanate available under the brand name "LANXIDE" from Lanxide Corporation of Newark, Del. This material has a low thermal coefficient of expansion, withstands high operating temperatures, and is relatively lightweight. Indeed, the material is so lightweight that those skilled in the art may find it desirable to add a flywheel to the power output shaft to provide additional inertia. It may be advantageous to coat the surfaces of the rotors directly exposed to heat with an insulative coating of low thermal conductivity material, while making the basic rotor structure of higher thermal conductivity.

An alternate embodiment of the present invention is shown in FIGS. 10 and 11. The internal combustion engine shown in FIGS. 10 and 11 has been modified to eliminate the central spur gear 68 (see FIGS. 1A and 2), while substituting an outer ring gear 150 having geared teeth along the interior of the ring for meshing with each of the four pinion gears 60-66 and maintaining the rotation of rotors 20-26 in unison. Outer ring gear 150 is secured to a circular drive disk 152 which is coupled to, and rotates with, output drive shaft 70. Preferably, drive disk 152 has a series of openings 154 and 156 formed therein for allowing the oil lubricating mist to pass therethrough for lubricating the gears. Use of the outer ring 150 has the advantage of allowing the rotors to rotate at a relatively high RPM to produce high horsepower, while reducing the speed of output drive shaft 70. For example, if the pinion gears 60-66 have a pitch diameter of 2 inches, and the surrounding outer ring gear has a pitch diameter of 6 inches, the output drive shaft RPM will be one-third the RPM of the rotors. Thus, if the internal combustion engine were used to drive the propeller of an airplane, the output drive shaft 70 could be directly coupled to the propeller without the need for interposing a speed reducing gear box between the engine and the propeller. In this case, the internal combustion engine might be rotating, for example, at 6000 RPM, while the output drive shaft and propeller are rotating at only 2000 RPM.

Those skilled in the art will now appreciate that an improved pure rotary internal combustion engine has been described having no reciprocating or orbiting parts, and no moving valves. The described engine is highly efficient, has very low internal friction, good durability, and provides relatively high horsepower compared with its size and weight. Indeed, the applicants believe that the described rotary engine provides superior torque when compared with a conventional piston engine of the same volumetric displacement. For example, applicants believe that a 22 cubic inch engine weighing only approximately 35 pounds, and having a volume of approximately 0.8 cubic foot, will provide an output of approximately 32 horsepower. Moreover, the described rotary engine is relatively easy to manufacture.

In addition, since there are no cranks or connecting rods, many important elements of mechanical friction that are present in conventional piston engines are completely absent from the rotary internal combustion engine of the present invention. No valve devices are needed to regulate intake and exhaust strokes. Furthermore, while conventional piston engines have a mechanical efficiency on the order of 75%, applicants believe that rotary internal combustion engines constructed in accordance with the teachings of the present invention have a mechanical efficiency closer to 95%.

While the preferred embodiment of the present invention has been described using two truncated rotors, those skilled in the art will appreciate that a suitable rotary internal combustion engine can be produced using only one truncated rotor. In addition, while the preferred embodiment of the present invention is air-cooled, those skilled in the art will appreciate that the described engine can be modified to use other cooling systems. Moreover, those skilled in the art may find it desirable to add other accessories such as a fuel pump and generator.

While the present invention has been described with respect to a preferred embodiment thereof, such description is for illustrative purposes only, and is not to be construed as limiting the scope of the invention. Various modifications and changes may be made to the described embodiment by those skilled in the art without departing from the true spirit and scope of the invention as defined by the appended claims.

We claim:

1. A rotary internal combustion engine comprising in combination:

a. a grouping of four rotors, each being generally oval-shaped and each having first and second opposing ends, each of said rotors having first and second opposing planar faces, the first planar faces of said plurality of rotors lying substantially in a first common plane, and the second planar faces of said plurality of rotors lying substantially in a second common plane, each of said rotors having a peripheral surface extending between the first and second planar faces thereof, each of said rotors having a central axis of rotation extending perpendicular to its first and second planar faces, the peripheral surfaces of said rotors generally bounding a working volume disposed between said rotors, said working volume periodically increasing and decreasing in size as said rotors are rotated;

b. first and second endplates disposed on opposing sides of said plurality of rotors, said first endplate being disposed proximate and parallel to said first common plane, and said second endplate being disposed proximate and parallel to said second common plane, said first and second endplates lying on opposing sides of, and bounding, said working volume;

c. four driveshafts, each of said four driveshafts being secured to a different one of said four rotors, each of said four driveshafts extending along the central axis of rotation of the rotor to which it is secured, said driveshafts being disposed at the four corners of a square, each of said driveshafts having an end extending through at least one of said first and second endplates;

d. synchronizing means coupled to the end of each of said driveshafts for ensuring that said rotors rotate in the same angular direction as each other and at the same angular speed of rotation as each other;

e. a shroud surrounding said rotors and spaced apart therefrom for defining a gas flow space outside said working volume, said shroud having first and second opposing ends, the first end of said shroud extending about said first endplate, and the second end of said shroud extending about said second endplate;

f. air induction means coupled to the first end of said shroud for inducting air generally from the first end of said shroud toward the second end of said shroud and through the gas flow space of said shroud, said air induction means selectively inducting air into the working volume bounded by said rotors;

g. fuel means for adding a fuel to said working volume to form a combustible mixture with the air; and h. exhaust means coupled to the second end of said shroud for venting air from the gas flow space of said shroud and selectively venting exhaust gases from said working volume after ignition of the combustible mixture;

i. said rotors being forced to rotate to increase said working volume upon ignition of said combustible mixture.

2. The rotary internal combustion engine recited by claim 1 wherein the peripheral surface of each rotor rotates pas the peripheral surfaces of rotors adjacent thereto with a continuous, uniform running clearance.

3. The rotary internal combustion engine recited by claim 2 wherein at least one of said rotors includes a truncated first end for periodically creating a first opening to said working volume as said rotors are rotated, said air induction means being disposed proximate said at least one rotor and proximate the first opening for inducting air into said working volume as said rotors rotate.

4. The rotary internal combustion engine recited by claim 3 wherein a second of said rotors includes a truncated first end for periodically creating a second opening to said working volume as said rotors are rotated, said air induction means being disposed proximate said at least one rotor and proximate the first opening for inducting air into said working volume as said rotors rotate.

5. The rotary internal combustion engine recited by claim 4 wherein said first and second rotors that each include truncated first ends are disposed diagonally across from each other.

6. The rotary internal combustion engine recited by claim 1 wherein said exhaust means includes an exhaust manifold in communication with said shroud for carrying away exhaust gases, said exhaust means further including aerodynamic means for directing exhaust gases released from said working volume in a predetermined direction through said shroud toward said exhaust manifold.

7. The rotary internal combustion engine recited by claim 1 wherein said fuel means includes a fuel injector for periodically injecting fuel into the working volume between said rotors.

8. The rotary internal combustion engine recited by claim 1 wherein said synchronizing means includes four circular gears each coupled to the end of one of said driveshafts and a fifth central gear meshed with said four circular gears.

9. The rotary internal combustion engine recited by claim 1 wherein said synchronizing means includes four circular gears each coupled to the end of one of said driveshafts and an outer ring gear meshed with each of said four circular gears.

10. The rotary internal combustion engine recited by claim 9 wherein said synchronizing means further includes an output drive shaft coupled to said outer ring gear for providing a power take-off from the internal combustion engine, said output drive shaft rotating at a lesser rotational speed than said plurality of rotors.

11. A rotary internal combustion engine comprising in combination:

a. a grouping of four rotors, each being generally oval-shaped and each having first and second opposing ends, each of said rotors having first and second opposing planar faces, the first planar faces of said plurality of rotors lying substantially in a first common plane, and the second planar faces of said plurality of rotors lying substantially in a second common plane, each of said rotors having a peripheral surface extending between the first and second planar faces thereof, each of said rotors having a central axis of rotation extending perpendicular to its first and second planar faces, the peripheral surfaces of said rotors generally bounding a working volume disposed between said rotors, said working volume periodically increasing and decreasing in size as said rotors are rotated;

b. first and second endplates disposed on opposing sides of said plurality of rotors, said first endplate being disposed proximate and parallel to said first common plane, and said second endplate being disposed proximate and parallel to said second common plane, said first and second endplates lying on opposing sides of, and bounding, said working volume;

c. four driveshafts, each of said four driveshafts being secured to a different one of said four rotors, each of said four driveshafts extending along the central axis of rotation of the rotor to which it is secured, said driveshafts being disposed at the four corners of a square, each of said driveshafts having an end extending through at least one of said first and second endplates;

d. synchronizing means coupled to the end of each of said driveshafts for ensuring that said rotors rotate in the same angular direction as each other and at the same angular speed of rotation as each other;

e. a shroud surrounding said rotors and spaced apart therefrom for defining a gas flow space outside said working volume;

f. air induction means coupled to said shroud for inducing air through the gas flow space of said shroud and selectively inducting air into the working volume bounded by said rotors;

g. fuel means for adding a fuel to said working volume to form a combustible mixture with the air; and h. exhaust means coupled to said shroud for venting air from the gas flow space of said shroud and selectively venting exhaust gases from said working volume after ignition of the combustible mixture;

i. said rotors being forced to rotate to increase said working volume upon ignition of said combustible mixture;

j. wherein at least one of said rotors includes a truncated first end for periodically creating a first opening to said working volume as said rotors are rotated; and k. wherein a second of said rotors includes a truncated first end for periodically creating a second opening to said working volume as said rotors are rotated.

12. The rotary internal combustion engine recited by claim 11 wherein said first and second rotors that each include truncated first ends are disposed diagonally across from each other.

13. A rotary internal combustion engine comprising in combination:

a. a grouping of four rotors, each being generally oval-shaped and each having first and second opposing ends, each of said rotors having first and second opposing planar faces, the first planar faces of said plurality of rotors lying substantially in a first common plane, and the second planar faces of said plurality of rotors lying substantially in a second common plane, each of said rotors having a peripheral surface extending between the first and second planar faces thereof, each of said rotors having a central axis of rotation extending perpendicular to its first and second planar faces, the peripheral surfaces of said rotors generally bounding a working volume disposed between said rotors, said working volume periodically increasing and decreasing in size as said rotors are rotated, at least one of said rotors including a truncated first end for periodically creating a first opening to said working volume as said rotors are rotated;

b. first and second endplates disposed on opposing sides of said plurality of rotors, said first endplate being disposed proximate and parallel to said first common plane, and said second endplate being disposed proximate and parallel to said second common plane, said first and second endplates lying on opposing sides of, and bounding, said working volume;

c. four driveshafts, each of said four driveshafts being secured to a different one of said four rotors, each of said four driveshafts extending along the central axis of rotation of the rotor to which it is secured, said driveshafts being disposed at the four corners of a square, each of said driveshafts having an end plate through at least one of said first and second endplates;

d. synchronizing means coupled to the end of each of said driveshafts for ensuring that said rotors rotate in the same angular direction as each other and at the same angular speed of rotation as each other;

e. a shroud surrounding said rotors and spaced apart therefrom for defining a gas flow space outside said working volume, said shroud having first and second opposing ends;

f. air induction means coupled to said shroud for inducting air through the gas flow space of said shroud and selectively inducting air into the working volume bounded by said rotors, said air induction means including an air intake manifold in communication with the first end of said shroud for admitting air, said air induction means further including first aerodynamic means for directing air in a predetermined direction through the gas flow space of said shroud from said air intake manifold toward the second end of said shroud;

g. fuel means for adding a fuel to said working volume to form a combustible mixture with the air; and h. exhaust means coupled to said shroud for venting air from the gas flow space of said shroud and selectively venting exhaust gases from said working volume after ignition of the combustible mixture;

i. said rotors being forced to rotate to increase said working volume upon ignition of said combustible mixture.

14. The rotary internal combustion engine recited by claim 13 wherein said exhaust means includes an exhaust manifold in communication with the second end of said shroud for carrying away exhaust gases, said exhaust means further including second aerodynamic means for directing exhaust gases released from said working volume in a predetermined direction through the gas flow space of said shroud toward said exhaust manifold.

15. The rotary internal combustion engine recited by claim 14 wherein said shroud has an interior surface, and wherein the rotation of said rotors induces a tangential circulation of air through the gas flow space of said shroud between said rotors and the interior surface of said shroud, and wherein said rotary internal combustion engine further includes aerodynamic strakes extending along the interior surface of said shroud generally parallel to said rotor driveshafts for converting tangential circulation of air into air flow from the first end of said shroud toward the second end of said shroud.

16. The rotary internal combustion engine recited by claim 15 wherein said first aerodynamic means includes intake turning vanes for directing air toward the working volume between said rotors.

17. The rotary internal combustion engine recited by claim 15 wherein said second aerodynamic means includes exhaust turning vanes for directing exhaust gases away from the working volume between said rotors and toward said exhaust manifold.

18. The rotary internal combustion engine recited by claim 16 wherein said second aerodynamic means includes exhaust turning vanes for directing air and exhaust gases away from the working volume between said rotors and toward said exhaust manifold.

19. The rotary internal combustion engine recited by claim 18 wherein said intake turning vanes are radially displaced from said exhaust turning vanes by an angle substantially equal to 90 degrees.

20. A rotary internal combustion engine comprising:
first, second, third, and fourth rotors each having a central axis of rotation extending parallel to one another, the rotors each having an external, peripheral surface, the peripheral surfaces of the rotors defining a working volume therebetween;
first and second endplates disposed on opposing sides of said first, second, third, and fourth rotors, said first and second endplates lying on opposing sides of, and bounding, said working volume;
means for synchronizing rotation of the rotors about their respective central axes;
a shroud surrounding said rotors and spaced apart therefrom, the shroud and the peripheral surfaces of the rotors defining a gas flow space therebetween, said shroud having first and second opposing ends, the first end of said shroud extending about said first endplate, and the second end of said shroud extending about said second endplate;
air induction means coupled to the first end of said shroud for inducting air generally from the first end of said shroud toward the second end of said shroud and through the gas flow space of said shroud;
exhaust means coupled to the second end of said shroud for venting air from the gas flow space of said shroud and selectively venting exhaust gases from said working volume after ignition of a combustible mixture;
means for creating first and second intake paths when the rotors are in a first angular orientation with respect to their respective central axes, the first and second intake paths fluidly coupling the working volume and the gas flow space, the first intake path passing between the peripheral surfaces of the first and second rotors, and the second intake path passing between the peripheral surfaces of the third and fourth rotors, whereby an intake gas is admitted into the working space from the gas flow space through first and second intake paths when the rotors are in the first angular orientation; and
means for creating first and second exhaust paths when the rotors are in a second angular orientation with respect to their respective central axes, the first and second exhaust paths fluidly coupling the working volume and the gas flow space, the first exhaust path passing between the peripheral surfaces of the second and third rotors, and the second exhaust path passing between the peripheral surfaces of the first and fourth rotors, whereby an exhaust gas is exhausted from the working space into the gas flow space through the first and second exhaust paths when the rotors are in the second angular orientation.

21. The internal combustion engine of claim 20 wherein:
the first rotor comprises a truncated end, the truncated end being a portion of the peripheral surface of the first rotor by which the first intake path passes when the rotors are in the first angular orientation.

22. The internal combustion engine of claim 20 wherein:
the third rotor comprises a truncated end, the truncated end of the third rotor being a portion of the peripheral surface of the third rotor by which the second intake path passes when the rotors are in the first angular orientation.

23. A rotary internal combustion engine comprising:
a. first, second, third and fourth rotors each having a central axis of rotation extending parallel to one another, the rotors each having an external, peripheral surface, the peripheral surfaces of the rotors defining a working volume therebetween;
b. means for synchronizing rotation of the rotors about their respective central axes;
c. a shroud surrounding said rotors and spaced apart therefrom, the shroud and the peripheral surfaces of the rotors defining a gas flow space therebetween;
d. means for creating first and second intake paths when the rotors are in a first angular orientation with respect to their respective central axes, the first and second intake paths fluidly coupling the working volume and the gas flow space, the first intake path passing between the peripheral surfaces of the first and second rotors, and the second intake path passing between the peripheral surfaces of the third and fourth rotors, whereby intake gas is admitted into the working space from the gas flow space through first and second intake paths when the rotors are in the first angular orientation;
e. means for creating first and second exhaust paths when the rotors are in a second angular orientation with respect to their respective central axes, the first and second exhaust paths fluidly coupling the working volume and the gas flow space, the first exhaust path passing between the peripheral surfaces of the second and third rotors, and the second exhaust path passing between the peripheral surfaces of the first and fourth rotors, whereby exhaust gas is exhausted from the working space into the gas flow space through the first and second exhaust paths when the rotors are in the second angular orientation;
f. first and second intake air vanes, the first intake air vane being positioned between the shroud and the first and second rotors, the second intake air vane being positioned between the shroud and the third and fourth rotors, the first and second intake air vanes being configured to direct the intake air from the gas flow space toward the working volume; and g. first and second exhaust air vanes, the first exhaust air vane being positioned between the shroud and the second and third rotors, the second exhaust air vane being positioned between the shroud and the first and fourth rotors, the first and second exhaust air vanes being configured to direct the exhaust air from the working volume into the gas flow space.

* * * * *